United States Patent
Hansen et al.

(10) Patent No.: US 6,442,144 B1
(45) Date of Patent: Aug. 27, 2002

(54) METHOD AND APPARATUS FOR DISCOVERING NETWORK DEVICES USING INTERNET PROTOCOL AND PRODUCING A CORRESPONDING GRAPHICAL NETWORK MAP

(75) Inventors: Peter A. Hansen, Houston; Geoffery A. Schunicht, Spring; Charles W. Cochran, Houston; Viswa H. Rao, Cypress, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/098,026

(22) Filed: Jun. 15, 1998

(51) Int. Cl.[7] .............................................. H04L 12/28
(52) U.S. Cl. ........................ 370/255; 370/401; 370/475
(58) Field of Search ................................. 370/254, 255, 370/256, 257, 258, 389, 401, 475; 707/103 R; 709/224, 223, 226, 245; 714/2

(56) References Cited

U.S. PATENT DOCUMENTS

| | | | | |
|---|---|---|---|---|
| 5,185,860 A | * | 2/1993 | Wu ............................. | 709/224 |
| 5,796,951 A | * | 8/1998 | Hammer et al. ............ | 709/223 |
| 5,835,720 A | * | 11/1998 | Nelson et al. .............. | 709/224 |
| 5,864,653 A | * | 1/1999 | Tavallaci et al. ................ | 714/2 |
| 5,884,322 A | * | 3/1999 | Sidhu et al. ................ | 707/200 |
| 6,061,505 A | * | 5/2000 | Pitchaikani et al. ........ | 709/226 |
| 6,122,639 A | * | 9/2000 | Babu et al. ............. | 707/103 R |

* cited by examiner

*Primary Examiner*—Melvin Marcelo
*Assistant Examiner*—Inder Pal Mehra
(74) *Attorney, Agent, or Firm*—Akin, Gump, Strauss, Hauer & Feld, LLP

(57) ABSTRACT

A method and apparatus for discovering, identifying and graphically representing network devices on a network. The devices are discovered by obtaining the gateway address of the management workstations and then reading the internet protocol address table and the ARP cache from each gateway via SNMP. Each address read is compared with existing IP addresses, and if new, device IDs are created and assigned. Select attributes are then assigned to each device and then the devices are then identified. The devices are identified by making a DNS request on the corresponding IP address to determine the network name of the device. The SNMP then obtains the system name and object ID (OID) for each of the devices. The OID is then compared and matched with known OIDs to identify the device. the devices are graphically connected and laid out by creating a submap based on the IP address and mask pairs for each device. The routers connected, the bridges are then connected and finally the repeaters are connected. Interface-level and port-level detailed connections are determined by comparing the connected device MAC address to the routing/ARP table entries in the case of a router, the forwarding database in the case of a switch/bridge, or the MAC address table in a repeater/hub.

12 Claims, 6 Drawing Sheets

METHOD AND APPARATUS FOR DISCOVERING NETWORK DEVICES USING INTERNET PROTOCOL AND PRODUCING A CORRESPONDING GRAPHICAL NETWORK MAP

CROSS REFERENCE TO RELATED APPLICATIONS

This application is related to the following U.S. Patent applications:

U.S. application Ser. No. 09/098,030 entitled "Method and apparatus for Graphical Display of Multiple Network Monitors over Multiple Intervals", filed Jun. 15, 1998, pending;

U.S. application Ser. No. 09/098,027 entitled "Method and Apparatus for Automatic Monitoring of Simple Network Management Protocol Manageable Devices", filed Jun. 15, 1998, pending.

U.S. application Ser. No. 09/098,016 entitled "Method and Apparatus for Sending Address in the Message for an E-Mail Notification Action to Facilitate Remote Management of Network Devices", filed Jun. 15, 1998, pending;

U.S. application Ser. No. 09/098,031 entitled "Method and Apparatus for Verifying Network Devices using Simple Network Management Protocol", filed Jun. 15, 1998, pending; and All of the above applications are assigned to the assignee of the present invention, and are hereby incorporated herein in their entirety by this reference thereto.

AUTHORIZATION PURSUANT TO 37 C.F.R. 1.71(E)

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to computer network systems, and more particularly, but not by way of limitation, to a method and apparatus for discovering the existence of internet protocol (IP) based devices and their relationship to each other, and based upon this information producing a corresponding graphical network map of the network.

BACKGROUND OF THE INVENTION

Communication networks have changed the way people communicate, distribute, and share information. There are many different ways information can be accessed, shared, or communicated on a network. For example, communication networks are being used to access software applications running on a file-server, to send e-mail to someone in another room or even another country, and to access information on remote computer servers.

A network generally consists of many different network devices connected together to allow one device to benefit from another. Some of these network devices include switches, routers, repeaters, hubs, terminals, servers, queuing devices, and peripheral equipment such as printers, modems, and scanners.

Communication networks allow the user to access remote programs and remote databases either of the same organization or from other enterprises or public sources. They also provide communication possibilities faster than other facilities. Because of these optimal information and communication possibilities, communication networks will often increase the organizational learning rate, which many authors declare as the only fundamental advantage in competition.

Because networks often spread out over many floors or even cities, network management systems are an invaluable tool in monitoring and maintaining the networks operation. One network management tool is the simple network management protocol (SNMP). SNMP is a transmission protocol that was originally developed to manage nodes on a transmission control protocol/internet protocol (TCP/IP) based network but has become widely accepted as a standard for LAN network management as well and is used to manage and monitor a variety of network devices including computers, routers, hubs, bridges and repeaters.

SNMP generally consists of three parts: structure of management information (SMI); management information base (MIB); and the protocol itself. The SMI and MIB define and store the set of managed entities. The SNMP itself conveys information to and from these entities.

Through the use of graphical user interfaces (GUI), network maps have also become a helpful tool in managing and maintaining networks. A network map is a graphical representation or model of the network itself including all the network devices that make up the network. A user can then easily access and control the operation of a select network device with just the 'click' of a mouse on the corresponding representative icon.

As can be appreciated, when creating or maintaining a network map, there is an important need to not only reliably discover each of the network devices on the network, but to also accurately discover their relationships with each other to ensure a accurate usable graphical network map.

Thus, there is a market for network management systems that can more readily discover network devices and identify the relationship among the network devices. Any tool which saves the user time and makes it easier to determine the specifics of a network enhances the utility of a network management system.

SUMMARY OF THE INVENTION

The present invention overcomes the above identified problems as well as other shortcomings and deficiencies of existing technologies by providing a method and apparatus for discovering, identifying and graphically representing network devices on a network. The devices are discovered by obtaining the gateway address of the management workstations and then reading the internet protocol address table and the ARP cache from each gateway via SNMP. Each address read is compared with existing IP addresses, and if new, device IDs are created and assigned. Select attributes are then assigned to each device and then the devices are then identified. The devices are identified by making a DNS request on the corresponding IP address to determine the network name of the device. Using SNMP the system name and object ID (OID) are obtained for each of the devices. The OID is then compared and matched with known OIDs to identify the device. The devices are graphically connected and laid out by creating a submap based on the IP address and mask pairs for each device. The routers connected, the bridges are then connected and finally the repeaters are connected.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
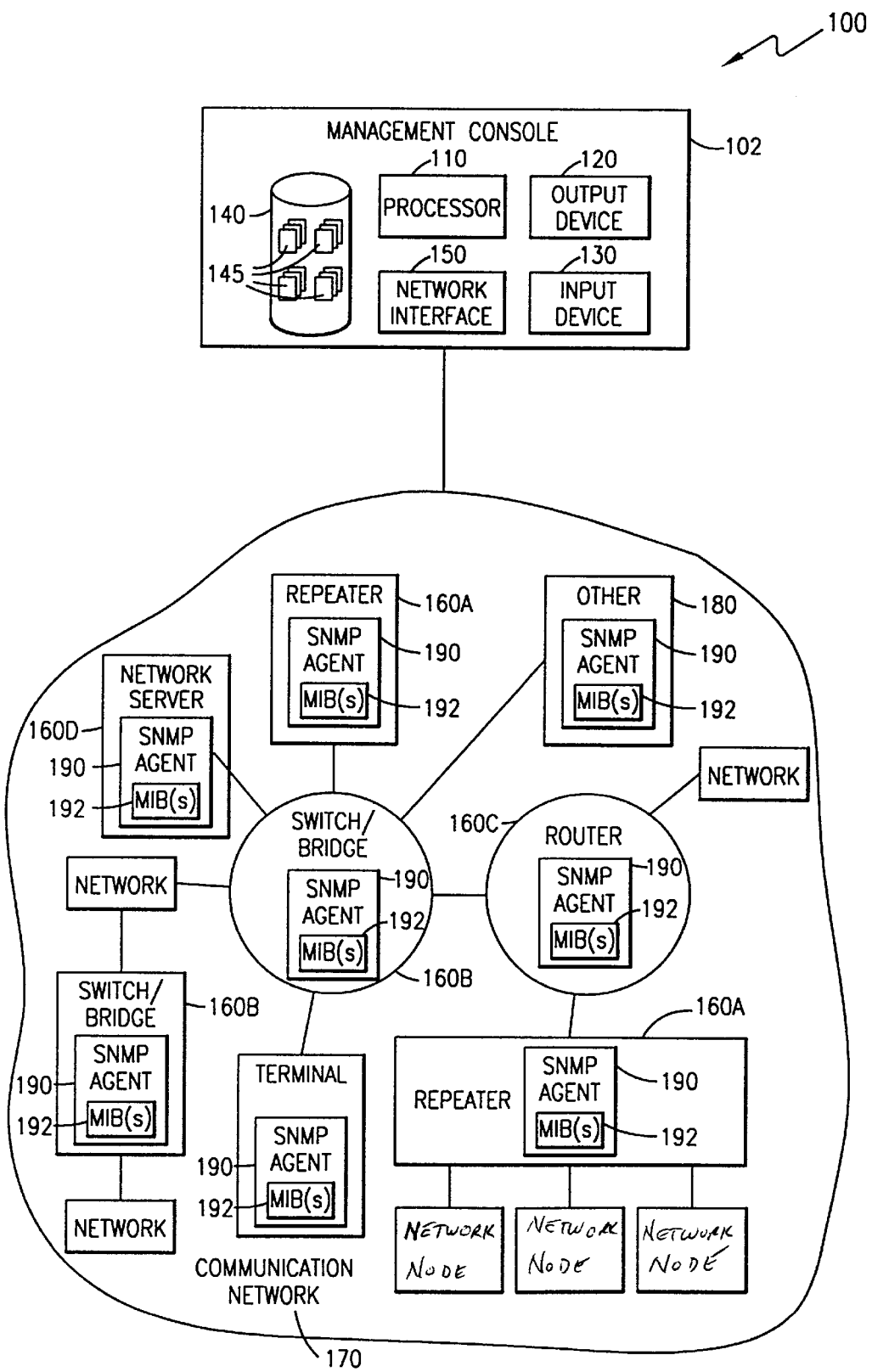
FIG. 1 is a block diagram of an exemplary computer network system utilizing th resent invention.

Referring now to FIG. 1, there is illustrated a block diagram of a computer network system 100 in which an exemplary embodiment of the present invention is being utilized to provide for the discovery of the existence of Internet protocol (IP) based devices on the network system and their relationship to each other and using this information to produce a graphical network map of the network system. An example of the utilization of the present invention can be found in Compaq's Netelligent Management Software, the user guide of which (5th edition) (Appendix A)is incorporated herein by reference.

As depicted in FIG. 1, computer network system 100 includes a management console 102 having a processor 110, an output device 120 such as a video display or printer, an input device 130 such as a keyboard or floppy disk drive, a storage device 140 such as random access memory (RAM) or a disk drive, and a network interface 150. Network interface 150 communicates with various network devices 160 and other devices 180 across a communication network 170.

Various network devices 160 reside within the communication network 170 and are manageable using a Simple Network Management Protocol (SNMP). SNMP is a communication network management protocol and defines a set of variables that an entity in a communication network maintains and consists of three parts: a Structure of Management Information (SMI); a Management Information Base (MIB); and the protocol itself. The MIB also includes a MIBII which is a particular instance of a MIB. Although various version of SNMP may exist, it is contemplated that the present invention is equally applicable to each version.

Still referring to FIG. 1, the network devices 160 include, but are not necessarily limited to, such devices as repeaters 160A, switch/bridges 160B, routers 160C, and network servers 160D. Various other devices 180 may also reside within the communication network 170 which are manageable using SNMP but which are not necessarily "communication network" type devices. Examples of other devices 180 include, but are not limited to, workstations and printers.

Within each SNMP manageable device, which includes network devices 160 and other devices 180, resides an SNMP agent 190. Within the SNMP agent 190 is located one or more MIB(s) including MIBII 192 which define the set of variables or database needed to monitor and control components in the communication network 170 such as, but not limited to, the network devices 160 and other devices 180. Using SNMP, the processor 110 located within the management console 102 accesses the SNMP agents 190 to retrieve information contained with the MIBs 192. The processor 110 stores the information within files 145 located within the storage device 140.

Figure 2A:
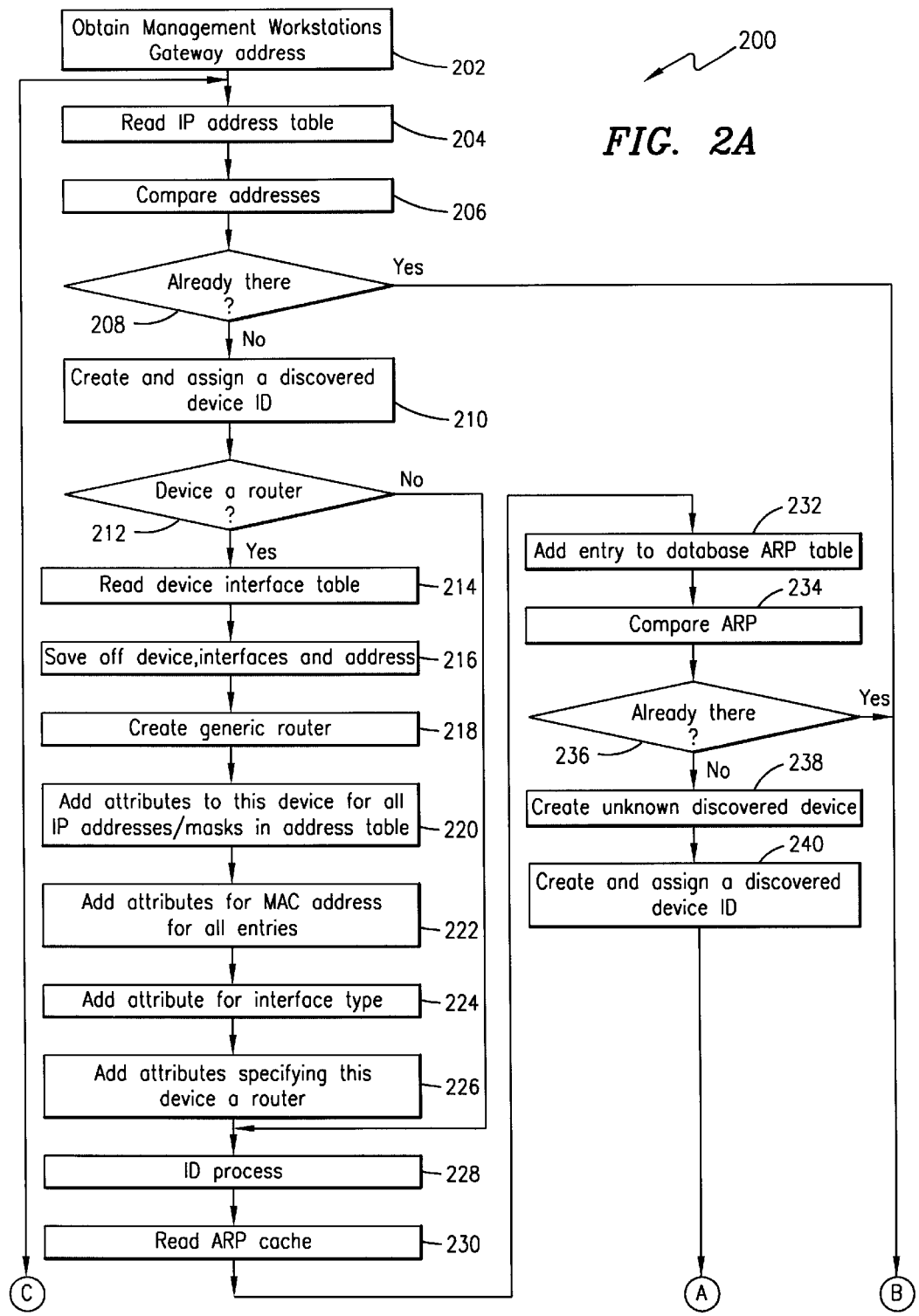
FIGS. 2a and 2b are a block flow diagram illustrating an exemplary method of the discovery of IP address and masks.
Figure 2B:
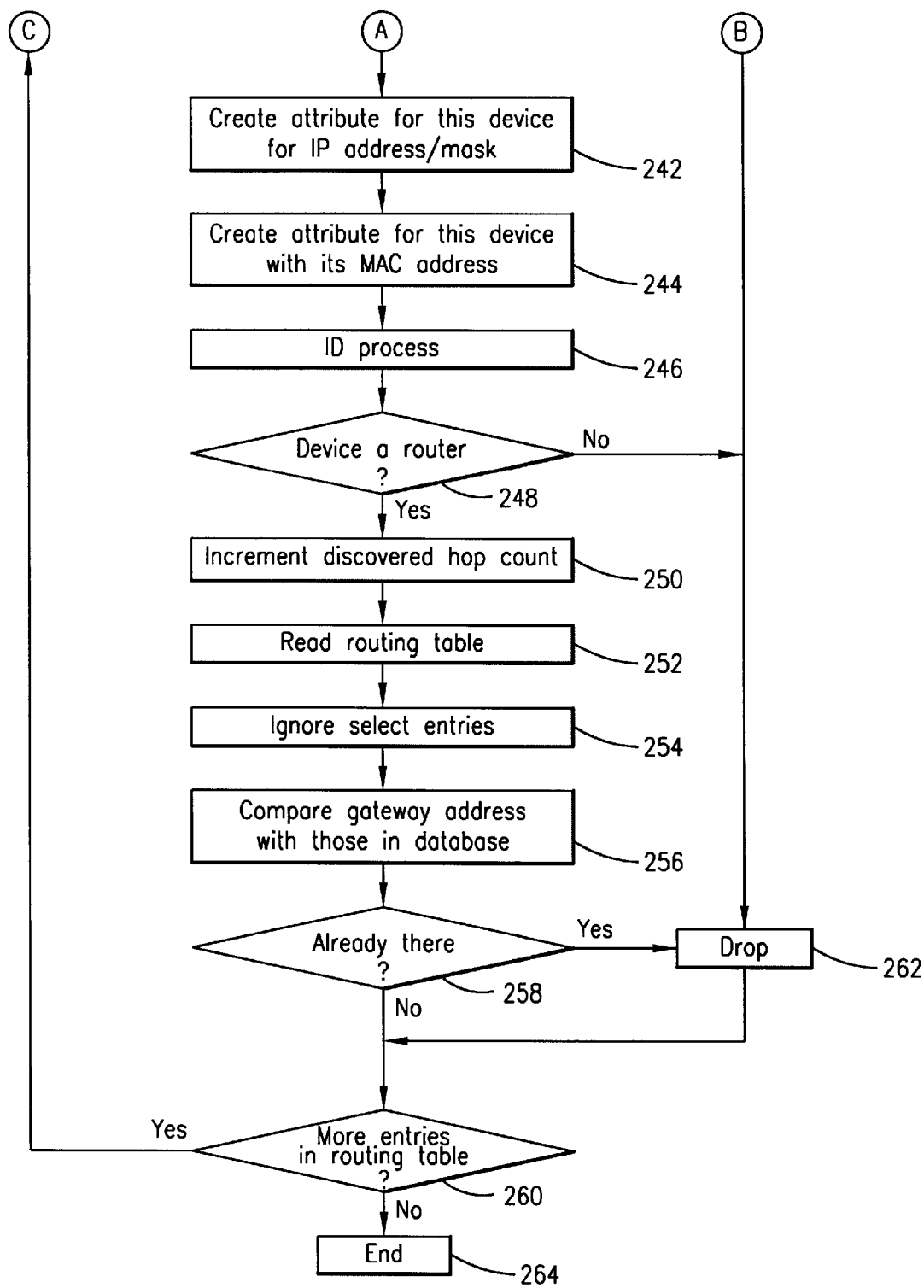

Referring now to FIG. 2a–2b, there is illustrated a block flow diagram 200 illustrating an exemplary embodiment of the discovery of internet protocol (IP) addresses and masks. Initially the management workstations gateway addresses are obtained (step 202). This can be accomplished through a number of techniques. For example the management workstations gateway address could be obtained through default gateway application programming interface (API) calls. Or it could be obtained by broadcasting a routing information protocol (RIP) route request packet on the local segment and monitoring for RIP replies from local segment router(s). Additionally a previous user's entered entries from an INI file could be read. Or it could be obtained from a user via dialog.

Next the IP address table from the gateway is read via SNMP (step 204). The addresses are then compared to the addresses already in the IP addresses database for the discovery session (206). Then a determination is made as to whether it was already there (208). If the determination is made that it was already there, then the 'yes' branch is followed and the thread is dropped (262). If the determination is made the it was not already there, the 'no' branch is followed. A discovered device ID is created and assigned for this device (210).

A determination is then made as to whether the discovered device is a router (212). If the determination is made that the discovered device is not a router, then the 'no' branch is followed to step 228. If the determination is made that the discovered device is a router, then the 'yes' branch is followed. The device's interface table is then read from the corresponding MIB (214). The device, interfaces, and addresses are saved of in the database (216). Attributes for to this device for all IP addresses/masks in the address table are added (220). Attributes for the MAC address for all entries in the address table are added (222). Attributes for interface type for all entries in the address table are added (224) and an attribute that this device is a router is added (226).

Then, as indicated by step 228, the identification process is spawned. A more detailed description of an exemplary embodiment of the identification process is given hereinbelow with reference to FIG. 3.

The address resolution protocol (ARP) cache from the gateway is then read via SNMP (230). Entries to the database ARP table are added, which are keyed by the discovered device ID of the gateway (232). Each device in the holding area is compared with the map to the to the new ARP entries (234), and a determination is made as to whether the device already exists (236). If the determination is made that the device already exists, the 'yes' branch is followed to step 262 and the thread is dropped. If the determination is made that the device does not already exist, the 'no' branch is followed and an unknown discovered device is created in the holding area base on each new ARP entry (238), the mask from the gateway's address is used with this entry. Then, a discovered device ID is created and assigned for each discovered device (240). IP address/mask attributes for each discovered device are created (242), and MAC address attributes for each discovered device are created (244). Attributes are specific values or a list of values for a particular characteristic of configuration of a device. Then, as indicated by step 246, the identification process for each discovered device is spawned (see FIG. 3).

Then, as indicated by step 248, the determination is made as to whether the discovered device is a router. If the determination is made that the discovered device is not a router, the 'no' branch is followed to step 262. If the determination is made that the discovered device is a router, the 'yes' branch is followed and the discovered hop count is incremented (250). At this point a comparison could be done as to wether the discovered hop count exceeds a user specified hop count, and if it does drop this device. Then, as indicated by step 252, the routing table is read via SNMP. Selected entries, such as local host entries, entries with a metric of 'infinite' and entries with a mask of '255.255.255.255' are ignored (254). A comparison of the gateway addresses is then made with the address in the database, holding area, and map (256). A determination is made as to whether the gateway addresses already exists (258). If the determination is made that the gateway address already exists, the 'yes' branch is followed to step 262, and the device is dropped. If the determination is made that the gateway address does not already exist, the 'no' branch is followed. Then as indicated by step 260, for each entry in the routing table, the process recurs back to step 204.

Figure 3:
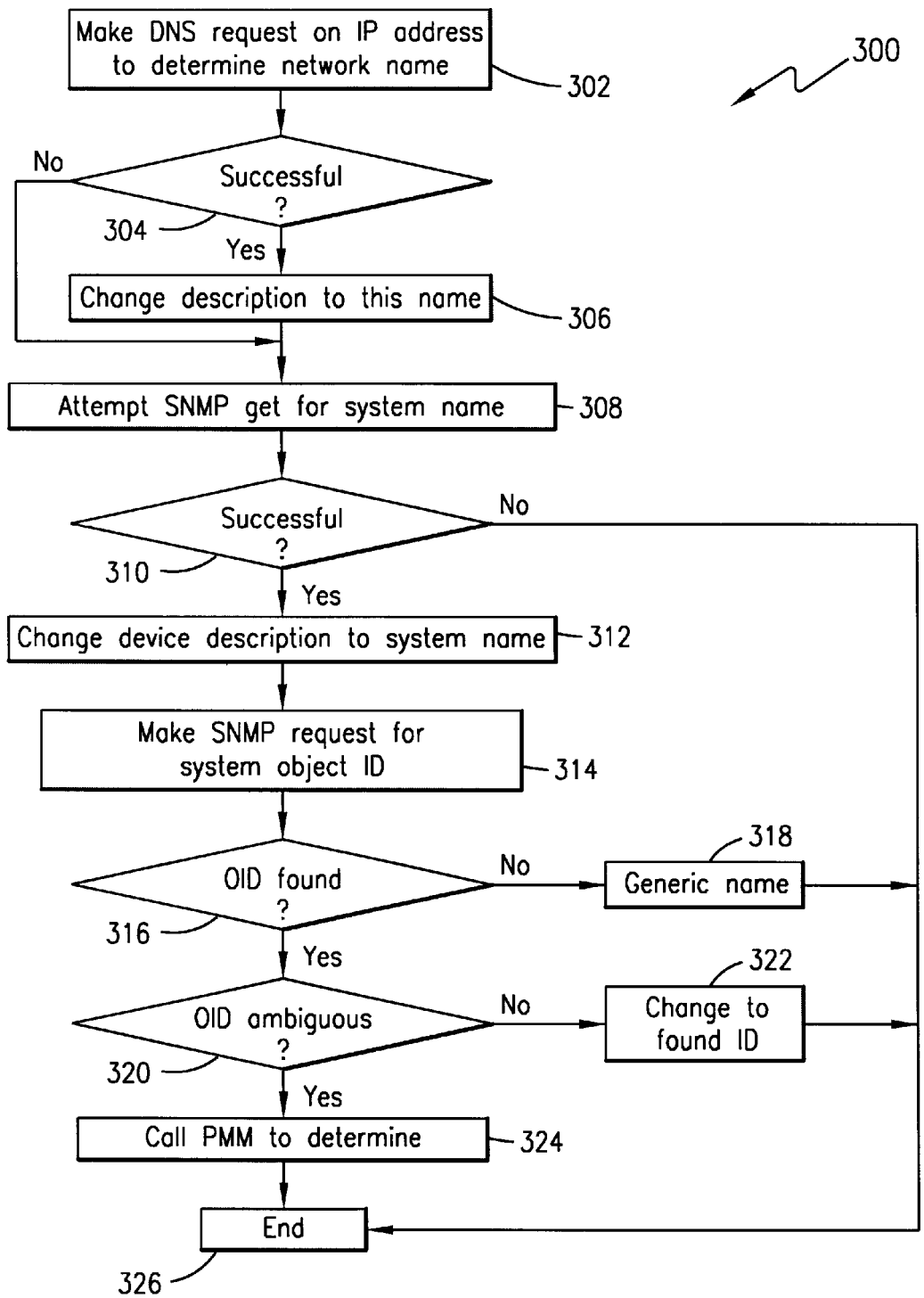
FIG. 3 is a block flow diagram illustrating an exemplary method of the identification of the devices discovered.

Referring now to FIG. 3, there is illustrated a block flow diagram 300 of an exemplary embodiment of the identification of the devices discovered. It is contemplated that this can run concurrently with the discovery of the IP address and masks as described hereinabove with reference to FIG. 2. As indicated by step 302, a domain name system (DNS) request on IP address is made to determine the network name. A determination is made as to whether the DNS request was successful (304). If the determination is made that the DNS request was not successful, the 'no' branch is followed to step 308. If the determination is made that the DNS request was successful, the 'yes' branch is followed, and the description of the network name is change accordingly (306).

An SNMP request for the system name is then made (308). A determination is made as to whether the SNMP request was successful (310). If the determination is made that the SNMP request was not successful, the 'no' branch is followed to step 326 and the identification processes stops. If the determination is made that the SNMP request was successful, the 'yes' branch is followed and the device description is changed to the system name obtained (312).

An SNMP request is then made for the systems object ID (OID) (314). The OID is compared to all known OIDs from the devices files, and a determination is made as to whether a known OID has been found (316). If the determination is made that the OID found is not among all the known devices types, the 'no' branch is followed, and a request for system services via SNMP is made and the device is change to a generic host, router or repeater based upon the layer supported in the system services (318). If the determination is made that the OID found is among the know device types, then the 'yes' branch is followed.

Then, as indicated by step 320, and determination is made as to whether the OID, although known, is ambiguous (such as a 2000 series repeater). If the determination is made that the OID is not ambiguous, the 'no' branch is followed and the device type is changed to the device found that matches the OID returned from the discovered device (322). If the determination is made that the OID is ambiguous, the 'yes' branch is followed and a product management module is called to make the final determination (324). The product management module may determine the ultimate identity through further SNMP calls to determine equipment types. Accordingly, the device type is changed per the product management module direction.

Figure 4:
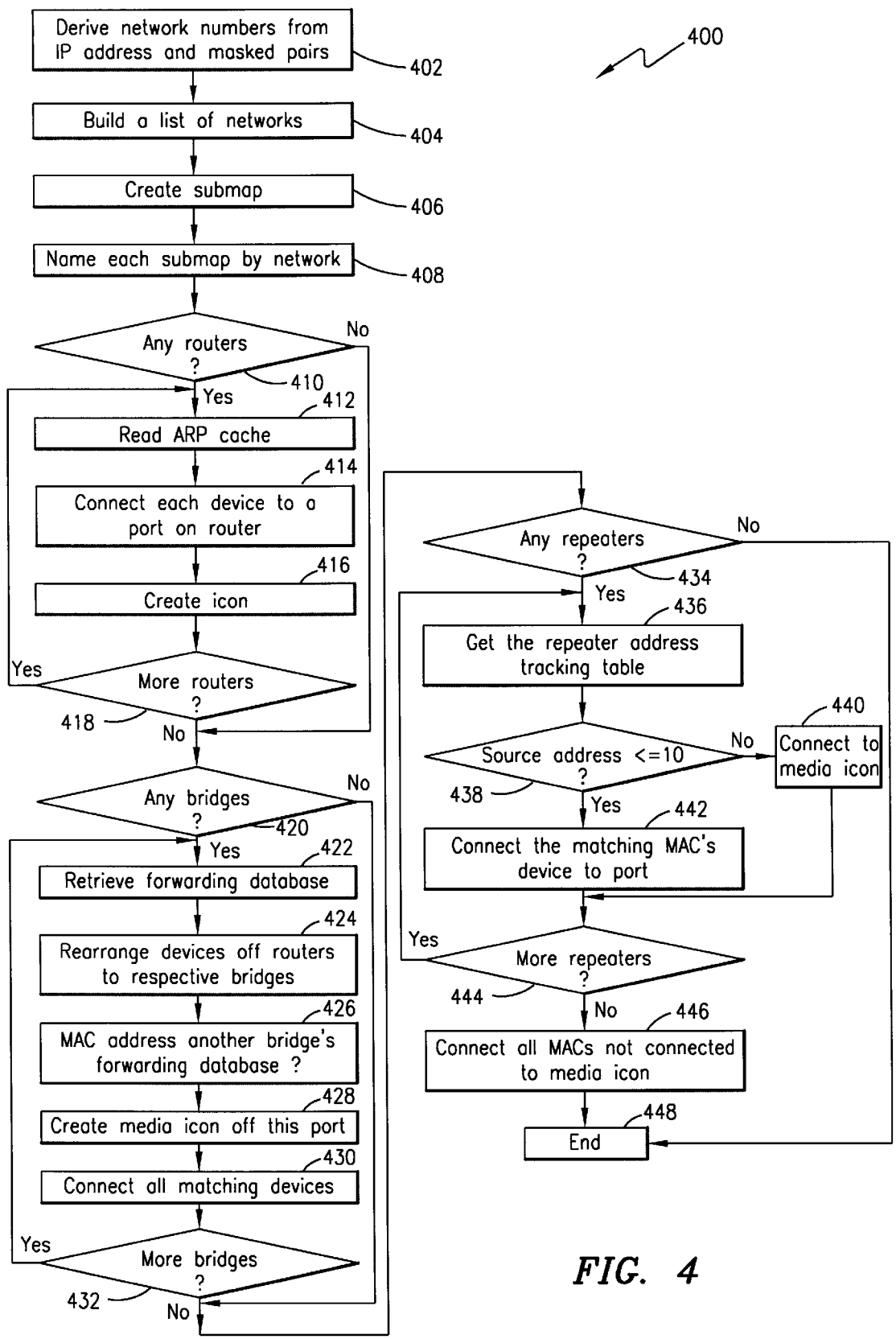
FIG. 4 is a block flow diagram illustrating an exemplary method for the production of the, physical connections and layout of the identified devices.

Referring now to FIG. 4, there is illustrated a block flow diagram 400 for identifying and graphically representing the physical connections and layout of the identified devices from FIGS. 2 and 3. It is noted, that the process illustrated in FIG. 4 does no begin until the processes depicted in FIGS. 2 and 3 have completed.

For all the devices in the holding area, the network numbers are derived from their corresponding IP address/mask pairs (402) and a list of networks is built (404). A submap is created from the main map for each network found (406) and each submap is named by the network number (408). As depicted by step 410, the routers are placed first. The ARP cache is read from the database for each router (412) and the MAC address for each device is used as a key to connect each device to a port on each router (414). Routers may connect to each other during this processes. At this point there will be a very rough map will all devices logically connected directly to their respective routers.

If the determination is made that there are no more routers to be placed (418), all bridges are then found (420). The forwarding database is retrieved from the device (422) and the devices are rearranged off of the routers to the respective bridges (424) by keying their MAC addresses to the forwarding database. If a MAC address for the port on a select bridge is another bridge's forwarding database (426), then all forwarding MAC entries to that port belong to the bridge connected to that port. If the MAC address for a port on a select bridge is another bridge's forwarding database then the port is already connected to another bridge. This indicates that there are probably multiple bridges or routers connected to an unmanaged device on this port. Therefore, a media icon off of this port is created (428) and all matching devices (by MAC in forwarding database/ARP cache) are connected to the media icon (430).

If the determination is made that there are no more bridges to be placed (432) all repeaters are then found (434). For each repeater, the repeater address tracking table is obtained via SNMP (436). Then as indicated by step 438, for each port with a source address change greater than a select number, such as ten, the port is connected to a media icon. As is further indicated by step 438, for each port with a source address change less than a select number, the matching MAC device is directly connected to the port (442). Then as indicated by step 444, a determination is made whether there are any more repeaters. If the determination is made that there are more repeaters, the 'yes' branch is followed to step 436. If the determination is made that there are no more repeaters, the 'no' branch is followed. Then, as indicated by step 446, using the forwarding database or ARP cache, all MACs not connected are connected to the media icon created in step 440.

Figure 5:
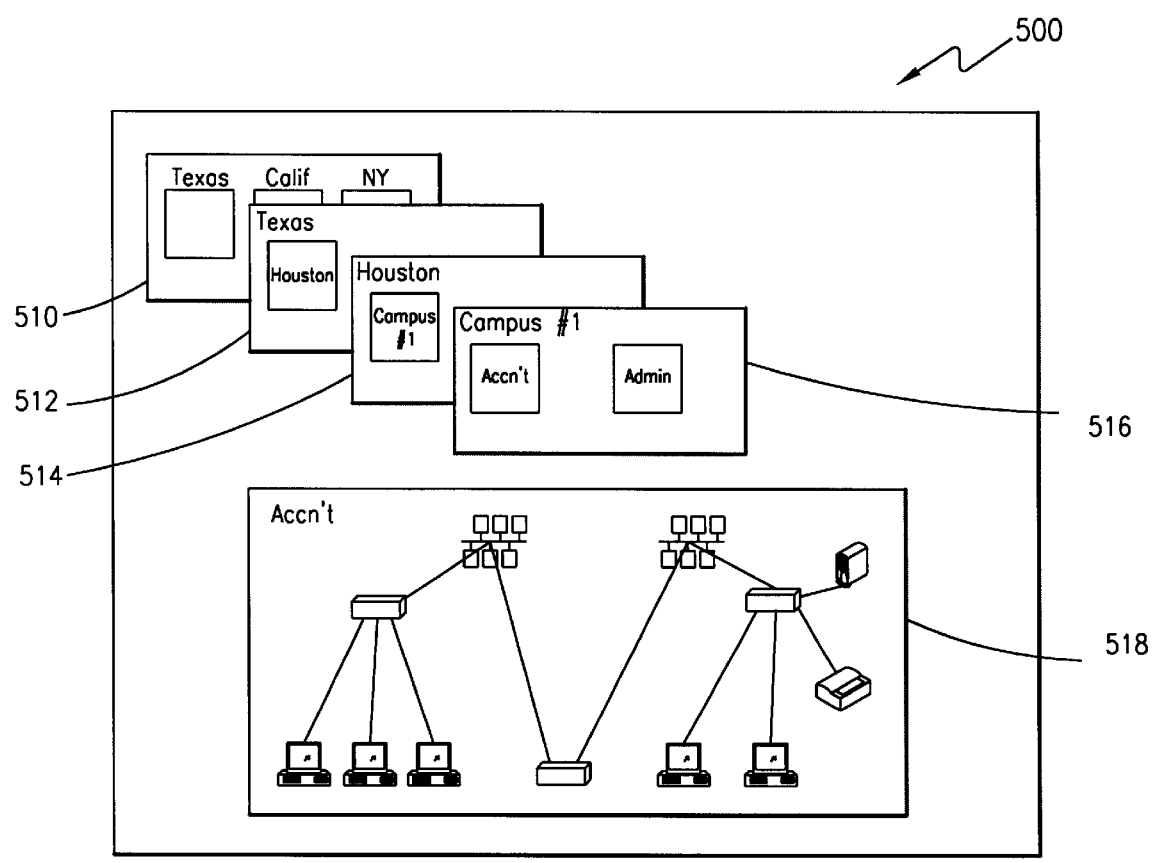
FIG. 5 is a diagram illustrating and exemplary map and submap of the present invention.

Referring now to FIG. 5, there is illustrated an exemplary network configuration 500 identified and graphically represented. As depicted configuration network 500 is an interstate network with sites in California, Texas and New York (510). The displayed submaps, 512–516 show each subsequent hierarchical level from state (512), to city (514), to campus (516), to floor (518). In this exemplary embodiment the floor level (518) displays the specific devices and media for the particular network configuration.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for discovering network devices on a network, said method comprising:

obtaining a gateway address for each of at least one management workstations;

reading an internet protocol address table from each gateway via a management protocol;

assigning a device identification for each unique address read from the internet protocol address table; and identifying the device corresponding to each assigned device identification.

2. The method of claim 1, wherein said step of obtaining is accomplished through default gateway application calls.

3. The method of claim 1, wherein said step of obtaining is accomplished by broadcasting a routing information protocol route request packet and monitoring for replies.

4. The method of claim 1, wherein said step of obtaining is accomplished by reading previous user entered entries.

5. The method of claim 1, wherein said step of obtaining is accomplished by being obtained from a user via user interface communication.

6. The method of claim 1, wherein said step of reading is accomplished via simple network management protocol.

7. A system for discovering network devices on a network, said system comprising:

gateway address identifier obtainers for obtaining a gateway address for at least one management workstation;

protocol address table readers for reading an internet protocol address table from each gateway via a management protocol;

device identification assigners, which assign device identifications for each unique address read from the protocol address table; and device identifiers that use an algorithm to identify a particular device type.

8. The system of claim 7, wherein said gateway address identifier obtainers comprise default gateway application calls.

9. The system of claim 7, wherein said gateway address identifier obtainers comprise routing information protocol route request packet broadcasters and reply monitors.

10. The system of claim 7, wherein said gateway address identifier obtainers comprise previous user entered entry readers.

11. The system of claim 7, wherein said gateway address identifier obtainers comprise dialog communicators.

12. The system of claim 7, wherein said protocol address table readers comprise simple network management protocol readers.

* * * * *